United States Patent
Moore

Patent Number: 5,358,087
Date of Patent: Oct. 25, 1994

[54] DEPTH STOP ASSEMBLY FOR A MACHINE TOOL

[76] Inventor: Michael J. Moore, 74 Valley Way, Exmouth, Devon, United Kingdom

[21] Appl. No.: 16,760

[22] Filed: Feb. 11, 1993

[30] Foreign Application Priority Data

Feb. 12, 1992 [GB] United Kingdom ............. 9202875.2

[51] Int. Cl.5 ............................................ F16D 71/04
[52] U.S. Cl. ..................................... 192/143; 192/138
[58] Field of Search ................ 192/143, 138, 139, 141

[56] References Cited

U.S. PATENT DOCUMENTS

| | | | |
|---|---|---|---|
| 2,168,326 | 8/1939 | Collins | 192/139 |
| 2,342,691 | 2/1944 | Plensler | 192/143 |
| 2,417,434 | 3/1947 | Mead et al. | 192/143 |
| 3,693,773 | 9/1972 | Wickham et al. | 192/143 X |

FOREIGN PATENT DOCUMENTS 0036379 9/1981 European Pat. Off. ............ 192/141

*Primary Examiner*—Rodney H. Bonck
*Attorney, Agent, or Firm*—Ira S. Dorman

[57] ABSTRACT

In a turret mill of the kind in which a doughnut 20 moves with the tool head along a threaded vertical rod 1, a tube 4 is slidably mounted on the rod 1 between end plates 5 and 6 which support a turret 7. The turret 7 can be rotated to bring a series of axially adjustable stop elements 9 into position for contact with the doughnut 20, allowing downward movement of the tool head to be stopped in various quickly selectable positions. Such contact with a stop 9 causes the lower plate 6 to act on a head 3 secured to rod 1, which in turn operates a cutout 17 via a lever 16 to stop vertical feed of the tool head. Upward movement of the doughnut 20 engages the upper plate 5, which acts on the rod 1 via a plunger 25 and lever 26, causing the rod to move downwards. This again operates the cutout 17 to stop the tool head.

9 Claims, 2 Drawing Sheets

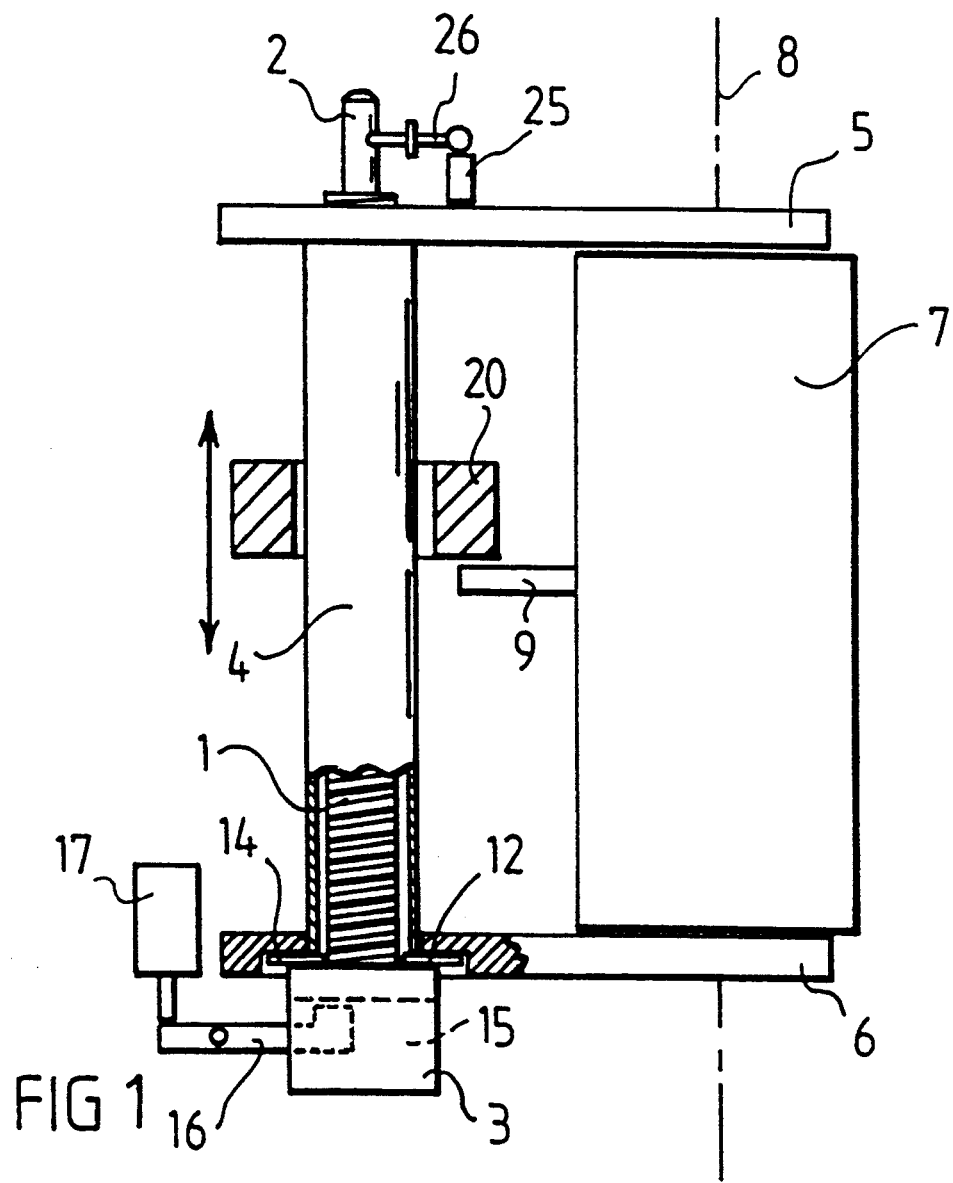
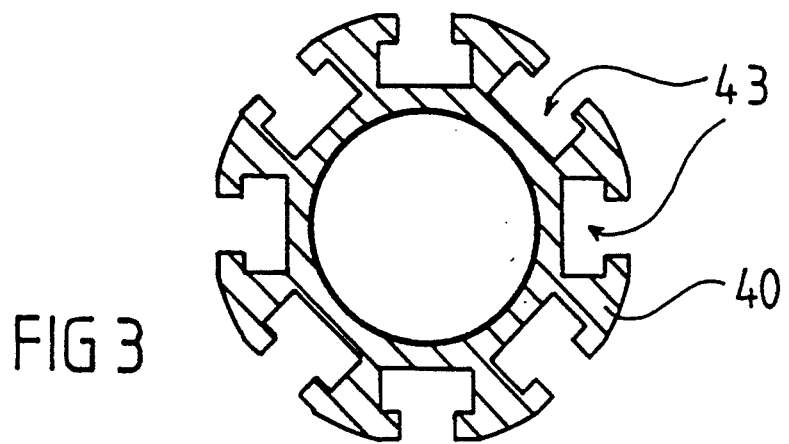

DEPTH STOP ASSEMBLY FOR A MACHINE TOOL

TECHNICAL FIELD OF THE INVENTION

This invention relates to machine tools such as turret mills, in which a tool head is mounted to move along an axis. More specifically, the invention is concerned with stop arrangements which are provided to limit the axial operating stroke of the tool head.

BACKGROUND

In a commonly encountered form of turret mill, a depth stop is provided by a pair of locking nuts which are screw-threaded onto a vertical rod. A component (usually a ring known as a "doughnut") is arranged to move axially of the rod above the locking nuts as the tool head moves up and down, so that when the doughnut encounters the locking nuts the downward movement of the doughnut, and hence of the tool head, is thereby limited. The limit of the downward movement is adjustable by first slackening the nuts, screwing them to a new position along the rod, and then re-tightening them.

In some uses of the turret mill it is necessary to carry out different operations which require the depth stop to be positioned at different heights. The sequence of operations may be repeated many times. It is thus necessary to reset the depth stops between operations, which is time-consuming and tedious. This problem has become more acute because a system has recently become available which enables tools to be changed quickly and easily, but the time required to re-adjust the depth stop accounts for a major part of the delay between tool changes.

An aim of the present invention may be viewed as being to provide an arrangement which greatly reduces the time required to change the stop position.

SUMMARY OF THE INVENTION

The present invention proposes a stop assembly for a machine tool of the kind in which a tool head is mounted to move along an axis, the stop assembly comprising a carrier member provided with at least two independently adjustable and pre-settable stop elements, and in which said carrier member is movable to bring each of said stop elements in turn into an operating position in which the respective stop element is engageable with a component that moves axially with the tool head to limit the axial stroke of the tool head.

Although the carrier member may take various forms the carrier member is preferably rotatable about an axis and the stop elements are arranged at angularly spaced positions about said axis.

The carrier member is preferably mounted for movement in a first direction (e.g. downwards) and the arrangement is such that engagement of the said component with a stop element moves the carrier member in the first direction to operate a cutout for the tool head. The carrier member may act to cause axial movement of a threaded rod which in turn operates the cutout.

The cutout will usually operate to stop axial feed of the tool head.

The arrangement may be such that movement of the said component in a second direction (e.g. upwards) opposite to the first direction causes the component to contact an abutment which in turn operates a cutout (which may be the cutout previously referred to) for the tool head. Preferably the abutment is coupled to the carrier member such that the abutment and carrier member move together in the second direction. Movement of the abutment in the second direction may be arranged to cause pivotal movement of a lever arrangement which acts on the threaded rod previously referred to to cause movement thereof in the first direction. Thus, when the component engages the abutment the rod moves to operates the cutout.

The carrier member is preferably mounted to move with a tubular member which is axially slidable on the threaded rod. The component that moves with the head and which engages the stop elements may move axially of the rod.

Thus, the tube and carrier member may be mounted on the existing threaded rod of a known form of turret mill in place of the usual locking nuts. By virtue of the relative sliding movement between the tube and the rod the depth stop arrangement can fully utilise the existing cutout arrangement of the machine.

BRIEF DESCRIPTION OF THE DRAWINGS

The invention is exemplified in the accompanying drawings, in which:

FIG. 1 is a diagrammatic side view, partly in section, of a depth stop assembly of the invention, installed in a known form of turret mill, FIG. 3 is section III—III of FIG. 2.

DETAILED DESCRIPTION OF THE DRAWINGS

Figure 2:
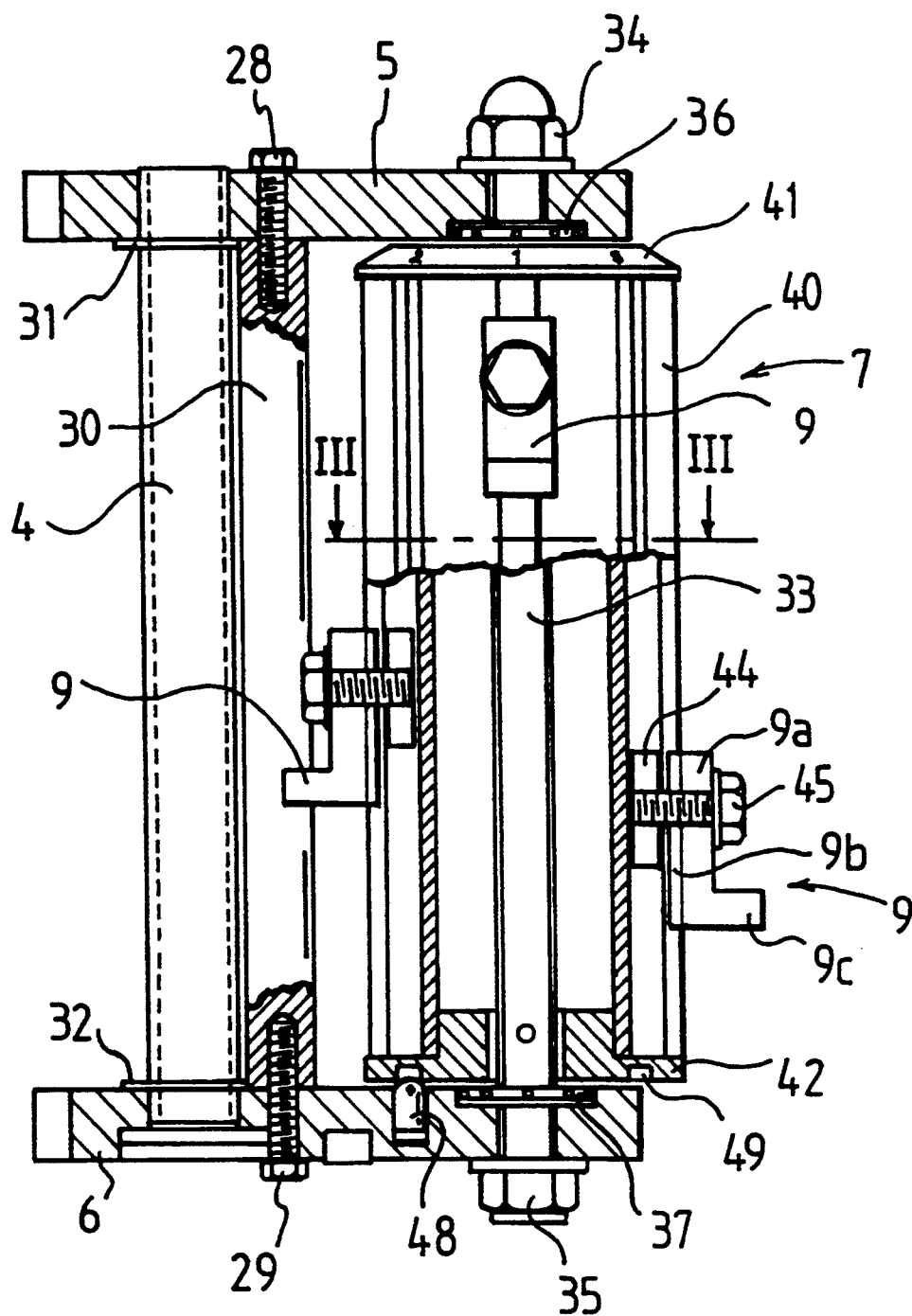
FIG. 2 is a more detailed side view of part of the assembly, again shown partially in section.

Referring firstly to FIG. 1, a screw-threaded rod 1 is vertically mounted for a limited amount of axial movement. The upper end of the rod has an axial projection 2 whereas the lower end is secured to a head 3 of larger diameter than the threaded portion. A tube 4 is slidably mounted on the threaded rod 1, rigidly secured between spaced parallel end plates 5 and 6. To one side of the tube 4, a generally cylindrical turret (carrier member) 7 is mounted between the end plates 5 and 6 for rotation about its axis 8, which is substantially parallel to that of the rod 1. The assembly of the tube 4, end plates 5 and 6, and turret 7 will be described in more detail below, but for present purposes it will be sufficient to note that the turret has a number of radially projecting stop elements 9, only one of which is shown in FIG. 1.

The lower end plate 6 is recessed to receive a shoulder 12 which is formed by the upper end of the head 3, and a thrust washer 14 is interposed between the shoulder 12 and the top wall of the recess. The head 3 contains a slot 15 which receives one end of a first pivoted lever 16. The opposite end of the lever 16 acts on a cutout switch 17 such that downward movement of the rod 1 acts via the head 3 to move the lever 16 and in turn operate the cutout 17.

Normally, such downward movement of the rod 1 will, in one possibility, be caused by contact between a doughnut 20 and a pair of locking nuts (not shown) received on the rod 1. The doughnut is located about the rod 1 and is secured with the usual tool head (quill) of the turret mill, which is driven to move along, and rotate about, a vertical axis. The doughnut thus moves vertically with the tool head so that when the doughnut moves downwardly to engage the nuts, the rod is moved downwardly to operate the cutout 17 as described. The nuts thus define the lower limit of movement of the tool head, and by adjusting their position along the rod 1 the depth of movement of the tool head can thus be adjusted. In the present case however, the nuts have been removed and replaced by the tube 4, plates 5 and 6 and turret 7. Now, the lower limit of the tool head is defined by contact between the doughnut 20 and the stop element 9 which acts via the plate 6 on the shoulder 12 to move the rod 1 downwardly and thus operate the cutout 17 which, in turn, stops axial feed of the tool head.

When the doughnut 20 reaches its upper limit of movement it engages the upper plate 5 which in turn operates a plunger 25 to move upwardly. The plunger acts on one end of a second pivoted lever 26 causing the opposite end of the lever to move downwardly, which end is engaged with the projection 2. Thus, the rod 1 is again moved downwardly, sliding within the tube 4, to again operate the cutoff switch 17 and stop axial feed of the tool head.

It will thus be appreciated that the existing cutoff arrangement at the limits of movement of the tool head are utilised without modification.

Referring now to FIG. 2, bolts 28 and 29 are inserted through the plates 5 and 6 into opposite ends of a spacer rod 30. The tube 4 is inserted into the plates 5 and 6 and located by spring clips 31 and 32 which abut the inner faces of the plates 5 and 6. The turret 7 is rotatably mounted on a spindle 33 which is inserted through the plates 5 and 6 and secured by nuts 34 and 35. Thrust bearings 36 and 37 are mounted at each end of the turret 7, recessed into the respective plates 5 and 6, to provide smooth rotation of the turret.

The turret 7 comprises a cylindrical side wall 40 and end cheeks 41 and 42. As shown in FIG. 3, the side wall 40 contains eight T-section axial slots 43 which are circumferentially spaced about the turret 7. (The precise number of slots provided could of course be varied.) A nut 44 (FIG. 2 again) is captive in each slot 43, and a bolt 45 is inserted through a stop element 9 into the nut 44. Each stop element 9 has a base part 9a having a guide rib 9b which projects into the respective slot 43, and an outwardly projecting foot 9c for engagement with the doughnut 20. The eight stop elements 9 can thus be adjusted to different vertical positions along the turret 7 by slackening the respective bolts 45, sliding the stop element to the required position along its slot 43, and then tightening the respective bolt so that the stop element is drawn towards the nut 44 to clamp the mouth of the slot therebetween.

The turret 7 can be rotated about its axis 8 to successively bring each of the eight stop elements into a position where they are engageable by the doughnut 20. The turret is positively located in each of these rotational positions by location of a spring-loaded plunger 48 in one of eight appropriately positioned depressions 49 in the lower face of the end cheek 42.

It will therefore be appreciated that when a number of operations are required to be repeatedly performed using different tools or to different depths, the lower limit of movement of the tool head can quickly be changed by rotating the turret 7 to the appropriate position to bring the required stop-element 9 into effect. Up to eight pre-settable and quickly reselectable stop positions are thus obtainable in the embodiment described, although it will be appreciated that the maximum number of stop elements which are provided could be varied.

Although the carrier member 7 is conveniently coupled to the threaded rod 1 by the tube 4 it will be appreciated that, within the scope of the invention, the carrier member could be movably mounted in other ways so that contact of the doughnut with a stop element causes operation of the cutout mechanism.

I claim:

1. A stop assembly for a machine tool of the kind in which a tool head is mounted to move on an axis in first and second opposite directions, said stop assembly comprising an engaging component mounted to move in said first and second directions along a first axis; and a carrier member provided with at least two pre-settable stop elements that are independently adjustable to selected positions on axes other than said first axis, said carrier member being movable to bring each of said stop elements from a position displaced from the path of movement of said engaging component to a position in said path for engagement with said engaging component to thereby enable interruption of the axial movement of said engaging component in said first direction, each of said stop elements serving to limit, in the selected axial position thereof, the stroke of a tool head operatively connected to said engaging component and moving in said first direction.

2. A stop assembly in accordance with claim 1, in which said carrier member is rotatable about a second axis and said stop elements are arranged on said other axes at angularly spaced positions about said second axis.

3. A stop assembly in accordance with claim 1, in which said carrier member is shiftable in said first direction, said engaging component and said carrier member being so arranged that engagement of the said engaging component with each of said stop elements effects shifting of said carrier member in said first direction to operate a cutout for a tool head.

4. A stop assembly in accordance with claim 3 further including a threaded rod for operating the tool head cutout, said carrier member being arranged such that shifting thereof in said first direction causes axial movement of said threaded rod to operate the cutout.

5. A stop assembly in accordance with claim 3 further including an abutment for operating the tool head cutout, movement of said engagement component in said second direction causing said engagement component to contact said abutment to operate the cutout.

6. A stop assembly in accordance with claim 5, in which said abutment is coupled to said carrier member such that said abutment and carrier member move together in said second direction.

7. A stop assembly in accordance with claim 4 further including an abutment, and a pivotable lever arrangement which acts on said threaded rod to effect movement thereof, movement of the said engagement component in said second direction causing said engagement component to contact said abutment, said abutment being coupled to said carrier member such that said abutment and carrier member move together in said second direction, and such that movement of said abutment in said second direction causes pivotal movement of said lever arrangement to act on said threaded rod to cause movement thereof in said first direction, to operate the cutout.

8. A stop assembly in accordance with claim 4 further including a tubular member that is axially slidable on said threaded rod, said carrier member being mounted to move with said tubular member.

9. A stop assembly in accordance with claim 4, in which said engagement component is arranged to move axially of said threaded rod.

* * * * *